United States Patent [19]

Carr et al.

[11] Patent Number: 4,609,941

[45] Date of Patent: Sep. 2, 1986

[54] TELEVISION SIGNAL STANDARDS CONVERSION

[75] Inventors: Michael D. Carr; David G. Morrison; Richard C. Nicol, all of Ipswich, England

[73] Assignee: British Telecommunications, London, England

[21] Appl. No.: 556,693

[22] Filed: Nov. 30, 1983

[30] Foreign Application Priority Data

Nov. 30, 1982 [GB] United Kingdom ................ 8234138

[51] Int. Cl.$^4$ ............................................. H04N 7/01
[52] U.S. Cl. .................................. 358/136; 358/134; 358/140; 375/27
[58] Field of Search ............... 358/133, 135, 136, 140, 358/134; 375/27

[56] References Cited

U.S. PATENT DOCUMENTS

| | | | |
|---|---|---|---|
| 3,423,526 | 1/1969 | Law | 358/136 |
| 3,715,483 | 2/1973 | Limb | 358/133 |
| 3,749,829 | 7/1973 | Burns | 358/136 |
| 4,057,836 | 11/1977 | Munsey | 358/134 |
| 4,099,202 | 7/1978 | Cavanaugh | 358/143 |
| 4,163,249 | 7/1979 | Michael et al. | 358/21 R |
| 4,271,431 | 6/1981 | Steber | 375/27 |
| 4,307,420 | 12/1981 | Ninomiya | 375/27 |
| 4,562,466 | 12/1985 | Clapp | 358/133 |

FOREIGN PATENT DOCUMENTS 2031687 4/1980 United Kingdom .

OTHER PUBLICATIONS

Fourth International Conference on Digital Satellite Communications, 23–25 Oct. 1978, Montreal, Canada, H. E. Wendt: "Intercontinental Transmission of 625—Line Colour Television Signals at 8.448 MBIT/S", pp. 256–260.
ICC '79 Conference Record, International Conference on Communications, Jun. 10–14, 1979, Boston, Ma. (US), H. G. Musmann et al.: "TV-Transmission Using a 64 KBIT/S Transmission Rate", pp. 23.3.1–23.3.5.
IEEE Transactions on Communications, vol. COM-25, No. 11, 1977, New York (US), Haskell et al.: "Interframe Coding of 525-Line-Monochrome Television at 1.5 Mbits/s", pp. 1339–1340.
Nachrichtentechnische Zeitshcrift, vol. 30, No. 3, Mar. 1977, Berlin (DE), J. Ost: "Zeilennormwandler in einem Video-Kommunikationssystem", pp. 223–225.
Technische Mitteilungen PTT, vol. 54, No. 12, 1976, Bern (CH), A. Kundig: "Experimental Terminal for Simultaneous Transmission of Speech and Still Pictures Over 64 kbit/s PCM Channels", pp. 456–474.
"A Codec for Visual Teleconferencing", by T. S. Duffy and R. C. Nicol, Communications, 82, IEE (UK) Conference Publication No. 209 (Appendix), (Apr. 1982), pp. 12–16.
"Practical Problems of Implementing a Conditional Replenishment Video Codec Over an Error-Prone Channel", by M. D. Carr, J. P. Temime, C. S. K. Clapp and J. C. Jolivet, Int. Conf. Digital Image Processing, York, Jul. 1982, (Appendix of Proceedings).

*Primary Examiner*—Howard W. Britton
*Attorney, Agent, or Firm*—Nixon & Vanderhye

[57] ABSTRACT

A television picture transmission system using conditional replenishment employs a scanning rate at the transmitter which differs (for asynchronous operation, slightly; or for operation between systems using different standards, considerably) from the scanning standard at the the receiver. The frame rate conversion is effected by the updating loops at the transmitter or receiver by, respectively, periodically stopping the coding loop for a field or frame so that no data is produced to produce a lower frame rate or periodically repeating a field or frame in the loop without adding any updating data so as to produce a higher frame rate. Resulting variations in data rate are accommodated by utilizing the buffering inherent in conditional replenishment systems. The jerkiness of motion in the received picture resulting from stopping the loop or repeating a field or frame can be reduced by the use of temporal interpolation in the generation of the updating data to anticipate the stopping or repeating of a field or frame, while conversion of the number of lines per frame can be effected by spatial interpolating using a transversal filter.

18 Claims, 8 Drawing Figures

TELEVISION SIGNAL STANDARDS CONVERSION

This invention relates to television signal transmission and is applicable especially to television systems in which the signal is transmitted using conditional replenishment techniques to enable a relatively narrow bandwidth transmission channel to be used.

Proposals and experimental systems have been made to transmit television signals along narrow bandwidth channels, and one such proposal has employed a conditional replenishment coder in which, in normal operation, only data relating to changing parts of a picture are transmitted and these data are used by a decoder at the receiver to alter a stored representation of the picture to reproduce the changes. In practice, the data and the stored representation are in digital form and a constant data transmission rate is used, which means that steps must be taken to restrict the rate of generation of change data when the picture is undergoing a large quantity of change, and that when the picture is still, absolute rather than differential picture element data can be transmitted to correct any accumulated error. Such a system is described in "A Codec for Visual Teleconferencing" by T. S. Duffy and R. C. Nicol, Communications 82, IEE (UK) Conference Publication No. 209 (Appendix), (April 1982), pp 12–16 and "Practical Problems of Implementing a Conditional Replenishment Video Codec over an Error-Prone Channel" by M. D. Carr, J. P. Temime, C. S. K. Clapp and J. C. Jolivet "I.E.E. Int. Conf. Digital Image Processing", (U.K.) York, July 1982 (Appendix of Proceedings). See also co-pending European Patent Application No. 83304259/U.S. patent application Ser. No. 516,707, now U.S. Pat. No. 4,562,466.

Such systems have previously involved synchronous operation-viz. the video field rate at the coding end and that at the decoder output are the same. It would be desirable to provide for asynchronous operation, for example to permit synchronisation of the video output at the decoder with local video sources. Also, operation between systems employing different standards would also be of value. For example, in Europe the television standards most widely employed (e.g. System I) have 625 interlaced lines per frame with a field rate of 50 Hz. In the United States of America and several other countries the television standard used (System M) has 525 interlaced lines per frame and a field rate of 60 Hz. It will be apparent that a television signal generated in accordance with one of the above standards could only be utilised by apparatus operating in accordance with the other standard after it had been converted to the other standard, and various forms of apparatus have been used to effect such conversion. The apparatus is complex and expensive.

The possibility of asynchronous operation has been briefly alluded to in the above-mentioned paper by Duffy & Nicol: also compatible cross-standard operation is referred to. Means by which such operation can be achieved has not hitherto been proposed, however.

According to one aspect of the present invention there is provided a television picture transmission system in which, at a transmitter, signals representing successive frames of a picture to be transmitted are compared with representations of earlier frames of the picture previously stored in a first picture store and data relating to changes in elements of the picture are generated and transmitted to a receiver where representations of the earlier frames of the picture previously stored in a second picture store are altered in response to the transmitted data to reproduce the later frames of the picture, wherein the frame rate of the picture to be transmitted is different from the frame rate at which the later frames are reproduced in the receiver and the frame rate at which the said data are transmitted is less than or equal to the lower of the two rates.

Data in respect of a frame which is to be coded may consist of information as to the changes in the picture relative to the previously coded frame, along with addressing information, or may be a code indicating that no change has occurred. The "frame rate" of the data is the number of frames thus coded in a given period of time, and is to be distinguished from the instantaneous frame rate and the data rate. As will appear more clearly from the ensuing description, if an incoming video signal at 30 frames per second is processed by coding every five frames and ignoring the sixth, then the frame rate of the data generated will be 25 per second, although the instantaneous frame rate is 30 for 5/6 of a second and zero for 1/6 of a second. The data rate is simply the amount of information generated, and would be expressed in bits per second.

In another aspect of the invention there is provided a coding apparatus for television signals with coding means comprising a picture store and means for comparing signals representing frames of the picture to be transmitted with representations of earlier frames of the picture stored in the picture store, to generate data relating to changes in elements of the frame, and buffer means for receiving that data at the rate at which it is generated and supplying it to an output at a regular rate, wherein the frame rate at which such data are generated is lower than the frame rate of the picture to be transmitted.

In a further aspect, the invention provides a decoding apparatus for encoded television signals comprising data relating to changes in elements of the picture, comprising buffer means for receiving the data at a regular data rate, and decoding means comprising a picture store and control means responsive to data received by the buffer means representing changes in picture content in respect of successive frames of the picture to update the picture store and arranged to read data from the picture store to produce a video signal, wherein the frame rate of the video signal produced is greater than the average frame rate of the received data.

In the decoder, with (for example) a 50 Hz to 60 Hz conversion this would mean that the updating loop would run at a field rate of 60 Hz and no updating would take place one frame or one field in six while the buffer refilled resulting in the repeating of a field or frame. In the case of a 60 Hz to 50 Hz conversion in the coder the updating loop would run at a field rate of 60 Hz and would stop for one frame or one field in six, resulting in a jump of one field or frame. In each case, the buffer serves to absorb the difference between the frames or fields at the lower rate and the frames or fields at the interrupted higher rate. The reproduction of movement would be subject to a certain jerkiness every tenth of a second or fifth of a second depending on whether a field or a frame is repeated or jumped (naturally this will not be so marked when the frame rate differences are smaller). Since the magnitude of the jerk would be smaller if a field were repeated or jumped, this would give a preferable result but would entail the additional difficulty of correcting for the fact that two odd or even fields would be adjacent when a jump or repeat occurred, and the odd and even field sequence would be reversed until the next jump or repeat. Vertical spatial correction is required to correct the line offset due to interlacing and there would possibly be some colour errors if the U and V signals are carried by alternate lines.

The jerkiness described could be eliminated at the cost of slight blurring of moving edges by the use of temporal interpolation, that is to say, by interpolating between the brightness (and colour) values of corresponding picture elements in two successive input frames, using proportions of the values depending on the time of the output frame relative to the times of the two successive input frames. The coefficients for effecting the interpolation could be stored in a read-only memory and read from it as required. Any slight departure from a simple numerical relationship, such as 5 to 6, which could occur and would otherwise make necessary the provision of a large number of interpolation coefficients, could be accommodated by periodically repeating or jumping an interpolation step. Such a departure would occur with an N.T.S.C. colour television signal which uses a field rate of 59.94 Hz, whereas the European standard uses a field rate of 50 Hz.

In order to convert the number of lines in a frame spatial interpolation can be used to correct for the different positions of the lines in the two frames concerned, and the difference between the durations of the lines corrected by the use of a buffer store into which the data representing a line are entered at the input rate and from which they are read at the output rate. The spatial interpolation may be effected by means of a transversal filter. Where the number of lines in a frame is to be increased greatly, e.g. by 50% or more, data from the interlaced field of lines may be used as well as those in the particular field.

Some embodiments of the invention will now be described, by way of example, with reference to the accompanying drawings of which.

Figure 1:
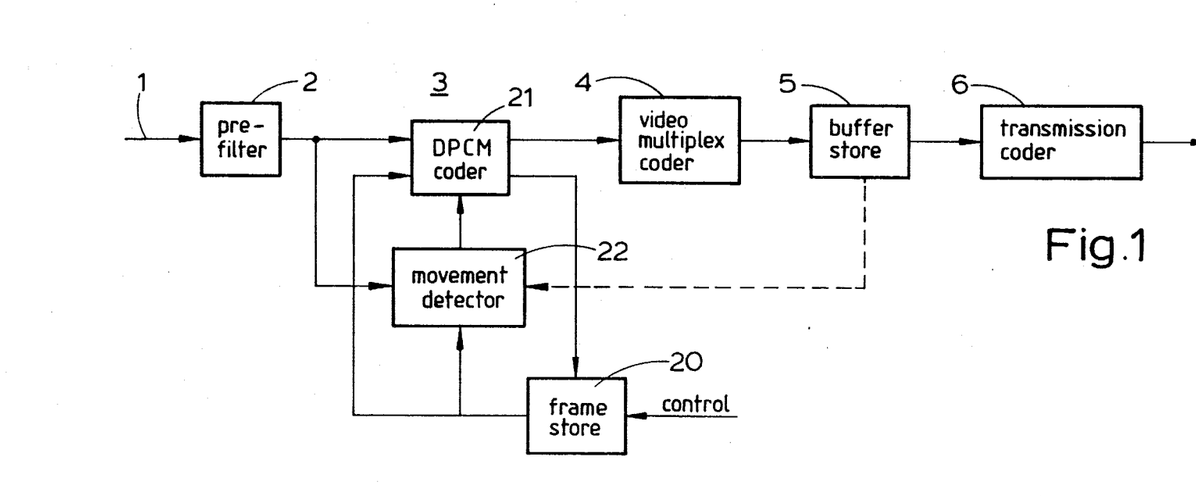
FIG. 1 is a diagram of a conditional replenishment coder.
Figure 2:
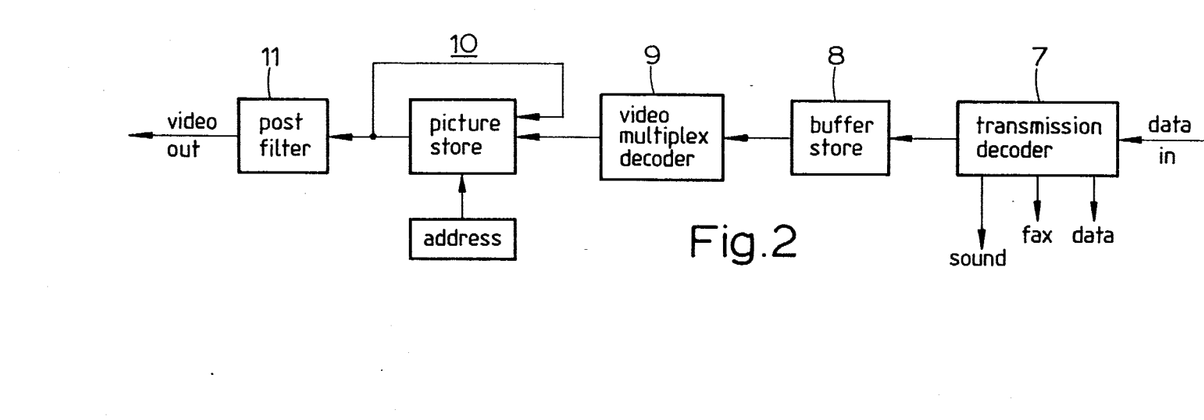
FIG. 2 is a block diagram of a conditional replenishment decoder.

FIGS. 1 and 2 show the components of a conditional replenishment video data transmission system of the type discussed in the above-mentioned papers, which takes in a television signal at the transmitter (FIG. 1) and reproduces a television signal at the receiver (FIG. 2) using conditional replenishment coding. The television signal to be transmitted is received over a line 1 and applied via an analogue to digital converter (not shown) to a pre-filter unit 2. The converter samples 256 elements in each line to produce luminance values Y and 52 elements in each line to produce the U and V colour signal values. In conditional replenishment coding, it is convenient to use PCM coded data because it is easier to store a frame of such data than a frame of data in analogue form. After spatial/temporal filtering in the pre-filter 2, the digital data is applied to a conditional replenishment coder indicated generally at 3 and the data produced by this coder are transmitted through a video multiplex coder 4 and buffer store 5 to a transmitter coder 6 where they are combined with sound data, facsimile transmission data and any other data which is required to be transmitted, all this data being in digital form. The transmission path may typically have a data rate of 1.5 or 2 megabits/second and is received by a transmission decoder 7 where the sound, facsimile and other data is separated from the video data which is applied via a buffer store 8 to a video multiplex decoder 9. A conditional replenishment decoder 10 receives the video data, reproduces the transmitted frame and passes it via a post-filter 11 and a digital to analogue converter (not shown) for regenerating a conventional television signal.

The conditional replenishment coder 3 includes a frame store 20, the conditional replenishment coding being effected by a differential PCM coder 21 which compares the incoming frame with that stored in the frame store 20 and produces an output which is applied to the video multiplex coder 4 representing the differences.

The video multiplex coder 4 converts the output data from the conditional replenishment coder into variable-length coded data words, thereby further reducing the effective data rate. The instantaneous data rate at the coder output is not constant, since it varies with the amount of movement in the transmitted picture, and the buffer store 5 serves to smooth the data rate to produce a standard 2Mbit/s data rate. A movement detector 22 is provided to vary the DPCM thresholds in the event of a large amount of movement, to avoid overfilling of the buffer store 5.

In the decoder, the buffer store 8 serves to receive the data from the transmission decoder 7 and supply it (via the video demultiplex decoder 9) to the conditional replenishment decoder 10 at the same, irregular rate at which the data were produced by the conditional replenishment coder 3. It will be appreciated that this system is essentially synchronous in operation—each field of the input video gives rise to an item of transmitted data (which may be actual picture change information, or a statement that the field is unchanged from the previous field) at the output of the transmitter: this in turn gives rise (following buffer and transmission delays) to a field being read out from the picture store forming part of the conditional replenishment decoder 10. This statement does not hold true if field sub-sampling is employed, but the end result is the same-viz. the input and output field rates are the same.

There will now be described a specific embodiment of the present invention in the form of a codec (COder-DECoder) capable of taking as an input signal a 525 line, 60 fields/sec (System M) television signal and producing from it a 312.5 line, 50 fields/second conditional replenishment signal for transmission to a remote codec designed to receive such a signal and produce from it a 625 line, 50 fields/sec (System I) television signal. The first mentioned codec is also arranged to receive a 312.5 line, 50 fields/sec conditional replenishment video data transmission from a remote codec and produce from it a 525 line, 60 fields/sec television signal. Thus, the particular codec to be described includes two sets of conversion circuits, one in the transmitter and one in the receiver. The function of such a codec is to provide a link between a US standard conditional replenishment video data transmission system and a European standard system which requires no alteration of the European standard codecs. It will be apparent that "312.5 line" standard for the transmitted signal is selected because it can easily be generated by interpolation from a 625 signal. The expression "312.5 line" is used for convenience; in fact, a System I signal contains only 572 active lines. Since the remainder (during field blanking) contain no picture information, the system will in fact transmit data in respect of only 286 lines (143 per field).

Figure 3:
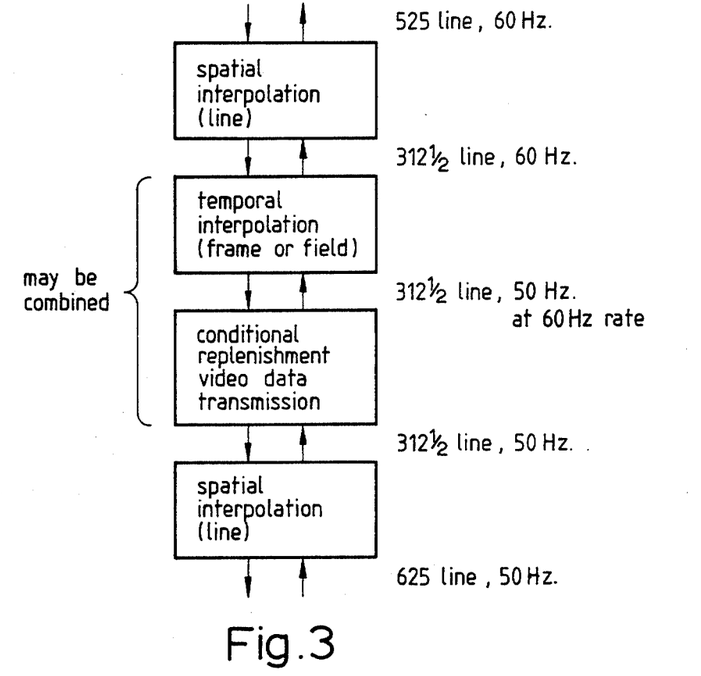
FIG. 3 is a diagram illustrating a possible series of conversion stages which could occur in the transmission of a 525 line, 60 fields/s picture to a receiver producing a 625 line, fields/s picture.

FIG. 3 shows a possible sequence of stages in the transmission of a television signal from a System M standard signal to a System I standard signal. In practice, an NTSC standard System M signal does not employ a 60 Hz field rate, but a rate of 59.94 Hz and there will be described later a technique for accommodating this departure from a simple numerical relationship between the frame rates of the two signals. As is indicated by the arrows in FIG. 3, the transmission from a European standard system to a US standard system using the same conditional replenishment transmission could follow the same four stages but in the reverse order.

Details will not be given of the actual generation of the conditional replenishment data from the television signals or the generation of the television signals from the conditional replenishment data as this is a well known technique and can be effected in any convenient manner.

Consider first the coder operation for a 525/60 input. The outline block diagram of the coder is as already shown in FIG. 1. However, in order to effect the change of field rate from 60 Hz to 50 Hz the operation of the frame store in the conditional replenishment coder 3 is modified in the following way.

The loop formed by the frame store 20 and the coder 21 is run at a field rate of 60 Hz, to retain synchronism, but in order to reduce the field rate of the outgoing data applied to the coder 4 to 50 Hz, the frame store 20 is stopped for one frame in six, so that the mean rate of data applied to the coder 22 is reduced to 50 fields/second. That is to say, one frame in six of the incoming video from the pre-filter 2 is disregarded and not entered into the store 20: no output is produced by the DPCM coder during this time. Thus, an irregular output data rate results. It will be recalled that the conventional coder includes a buffer store for smoothing the rate of data transmission since the rate of video data generation using conditional replenishment coding is influenced considerably by the amount of movement in the picture to be transmitted, although the details of the operation of the buffer stores in smoothing the data rates will not be described in detail since this has already been described in the patent applications referred to above.

During the five frames out of six not disregarded, the buffer tends to fill more rapidly than would be determined by the movement in the picture, only to empty again when the coding process is suspended. The store 20 now serves also to accommodate the variation in data rate due to the intermittent action of the conditional replenishment coder. Thus the buffer needs to be larger than would be required (all things being equal) for a 50 Hz in/50 Hz out coder. With such a simple system, the picture movement reproduced by the receiver would be slightly jerky because two-thirds of such movement would occupy four transmitted frames and one-third of such movement would occupy one transmitted frame.

This jerkiness could be reduced by repeating or omitting one field periodically instead of one frame which would result in the jerks being of half the size and twice as frequent. However, this would result in a change in the odd/even field order and would require the use of some means to effect the displacement of the lines to correct the positions of the lines in the frame when a field repeat or omission occurs.

The jerkiness would be reduced at the expense of slight blurring of moving edges by the use of what is termed temporal interpolation, by which is meant that the changes in picture element brightness are not coded at their actual values by the coder 3, but are coded to some intermediate value depending upon the timing of the frame concerned relative to the time of occurrence of the frame to be repeated or omitted by control of the frame store 20. This interpolation between the picture element brightnesses is stepped across from that of the earlier frame towards that of the later frame, or in the reverse order, as the repeated frame or omitted frame is timed to occur, so that the actual change in picture elements brightness occurs in evenly distributed steps despite the fact that a frame is going to be repeated or omitted.

The means by which the temporal interpolation just described is effected is explained with reference to FIG. 4 which is a block diagram of the pre-filter (replacing item 2 of FIG. 1) used in this embodiment of the invention. The circuit of FIG. 4 includes a frame delay 30 used in part of the pre-filter and the input to and output from this delay 30 are both applied to an interpolator 31 which produces at its output 32 a value between the values entering the leaving the delay 30 depending on a control signal applied to it over input 33. It should be borne in mind that the data are in digital form and consequently the interpolator 31 is a digital circuit which performs the generation of the required interpolated digital value. FIG. 5 shows in graphical form the nature of the interpolation performed by the interpolator 31 which is stepped progressively from the input value to the delay 30 to its output value or vice versa in dependence upon the timing of the frame relative to the timing of the repeated or omitted frame.

As mentioned earlier, a problem arises in the generation of the interpolation coefficients for the temporal interpolation when the frame rates are not in simple numeric relationship. This would arise in the case of a System M NTSC colour television signal which has a field rate of 59.94 Hz, whilst a European PAL signal has a field rate of 50 Hz. If the temporal interpolation were to be performed exactly for every frame, one thousand coefficients would have to be stored, and whilst this would be possible without undue hardware overhead, substantially the same result would be obtained if only the five or six interpolation coefficients were stored and one were to be repeated every 200 frames to bring the sequence of interpolations back into synchronism with the frames.

Figure 4:
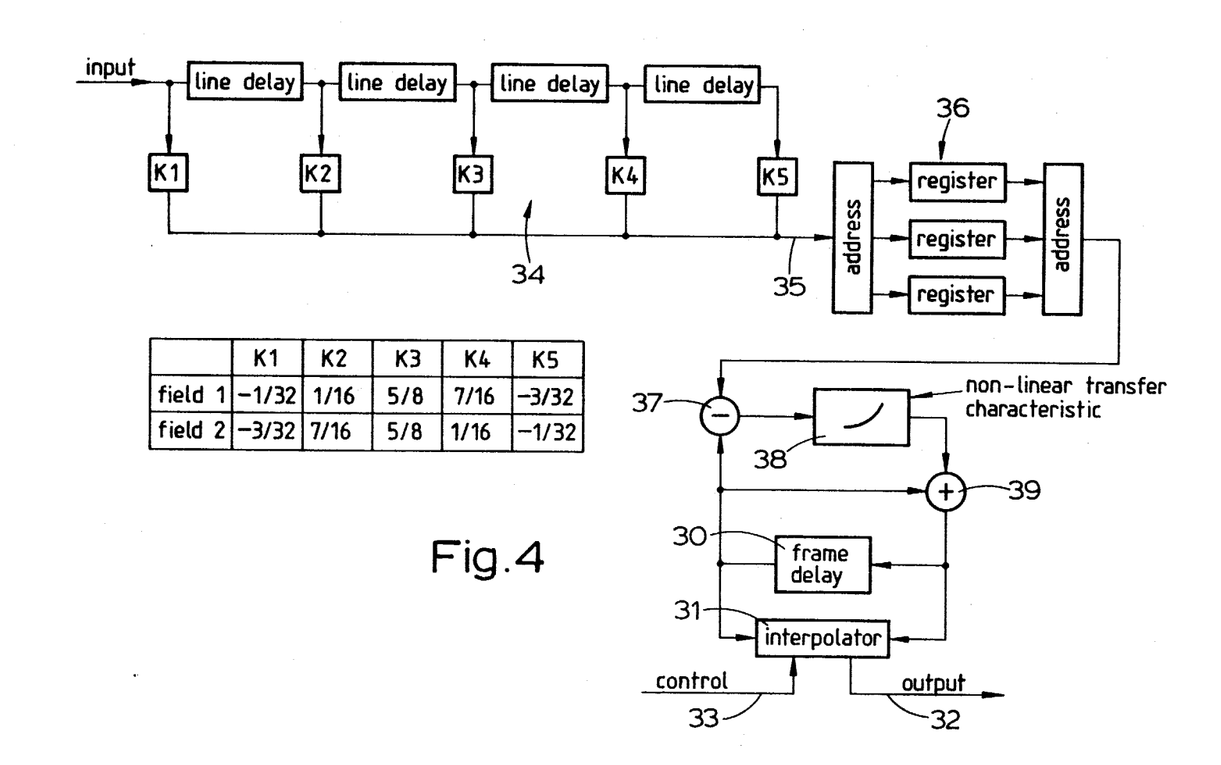
FIG. 4 is a block diagram of the pre-filter used in one form of coder according to the invention, and includes both spatial and temporal interpolation.
Figure 5:
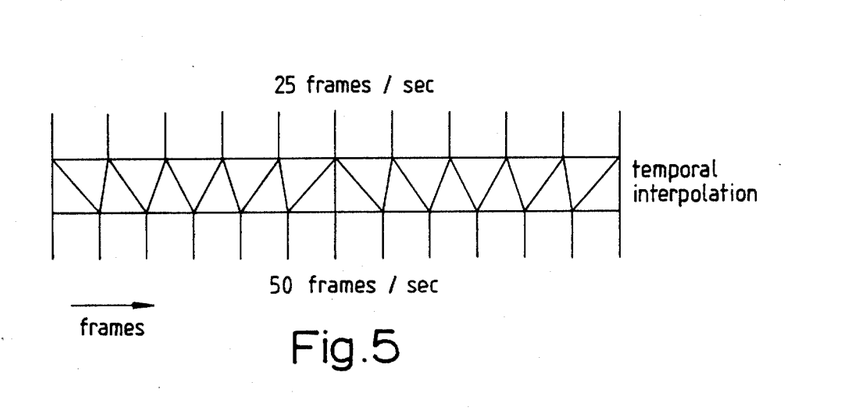
FIG. 5 is a diagram to be used in explaining the use of temporal interpolation.

The pre-filter of FIG. 4 also carries out line standard conversion and provides a nonlinear temporal transfer characteristic. The incoming television signal after conversion to digital form is applied to a transversal filter 34 which consists of four line delays in series and five multipliers which multiply the data by values k1, k2, k3, k4 and k5 respectively and apply the products to a common output 35. The output 35 is connected to a three-register buffer 36 and from this buffer the signal is applied to a subtraction circuit 37. The circuit 37 has as its second input the output of the frame delay 30 and the difference output is applied to a multiplier 38 having a non-linear characteristic. The output of the multiplier 38 is applied to a summing circuit 39 where the modified difference from the circuit 37 is recombined with the output of the frame delay 30.

The multiplier 38 has a characteristic such that low values of difference are relatively reduced, but higher values of difference are transmitted without alteration. It will be apparent that the effect of the circuit formed by the frame delay 30 and circuits 37, 38 and 39 is to reduce relatively small differences so that, for example, noise would be reduced and larger differences would not be reduced. Thus, if a small but progressive change were to occur, it would not be recorded in the frame store in the delay 30 at first, but as it built up to significant value it would be entered in full and stored in the delay 30.

The first part of the circuit of FIG. 4 is concerned with the processing of the incoming television signal to accommodate the change in the numbers of lines in a frame of the incoming television signal and that used by the conditional replenishment coder. In the example with which we are concerned, the incoming signal has 525 lines per frame and the conditional replenishment coder uses 312.5 lines per frame. Each of the three registers of the buffer 36 is arranged to store a line of the incoming frame at the rate at which it is received and it is read out from the registers at the rather lower rate required by the 312.5 line frame. Thus, each line is read out of a register of the buffer 36 in 107 $\mu$s, whereas it is entered into the register in 64 $\mu$s. The purpose of the transversal filter 34 is to compensate for the fact that the spatial position of a line in the 312.5 line frame would not always correspond exactly to the position of a line in the 525 line frame and the coefficients k1 to k5 of the multipliers are chosen to produce the corrected values of the picture element brightnesses in accordance with this change in the spatial position of the lines. The control of the values k1 to k5 could be effected by reference to values stored in the read-only memory, not shown. In the case of a 625 line input television signal, the values of the coefficients k1 to k5 are more simply calculated and these are shown in the table included in FIG. 4.

Figure 6:
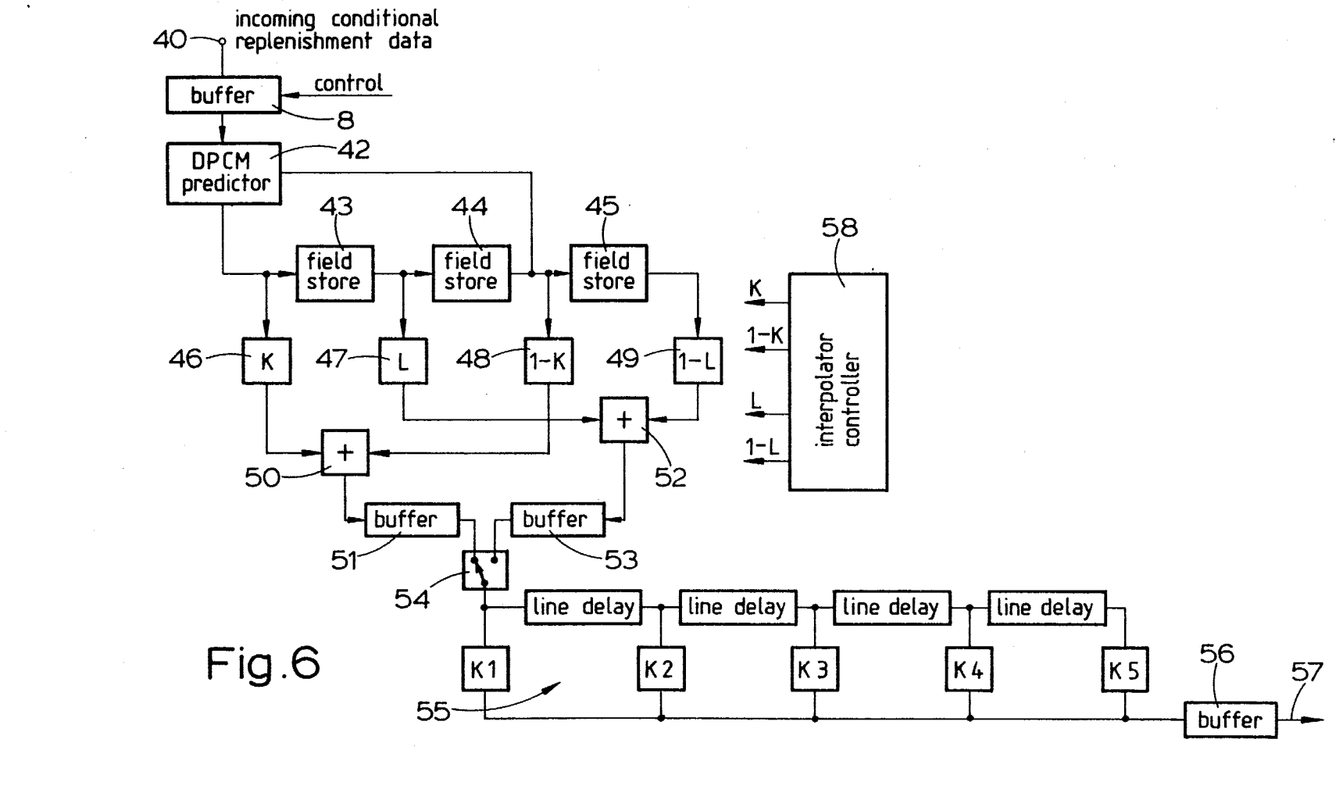
FIG. 6 shows one form of a conditional replenishment decoder in combination with a post-filter for effecting both temporal and spatial interpolation.

Part of the decoder of the codec is shown in FIG. 6 where incoming conditional replenishment data is applied at 40 to the buffer 8 and from that to a DPCM predictor 42 which effects the decoding of the conditional replenishment data. Two field stores 43 and 44 connected in series form the frame store for the picture and a third field store 45 is connected to the output of the store 44. Multipliers 46, 47, 48 and 49 are connected to the inputs of the field stores 43 and 44 and to the output of the field store 45 respectively. The outputs of the multipliers 46 and 48 are connected through an adding circuit 50 to an input of a buffer store 51. The outputs of the multipliers 47 and 49 are connected via an adding circuit 52 to the input of a buffer store 53. The outputs of the buffer stores 51 and 53 are applied to a transversal filter 55 and buffer 56 which produces at its output 57 a PCM television signal. In the example of the invention being described, the conditional replenishment data is based on a standard having a 312.5 line frame at 50 fields/sec and the output from the filter 54 is for a 525 line frame at 60 fields/sec. A controller 58 generates the values of K, L, 1-K, and 1-L, respectively for the multipliers 46 to 49 from values stored in a read-only memory.

The loop formed by the predictor 42 and the stores 43 and 44 circulates the stored frame at a field rate of 60 Hz (i.e. 30 frames per second). The incoming data is based on a field rate of 50 Hz and the buffer 8 is controlled to cause the conditional replenishment of the picture elements of the frame circulating in the decoder loop for five frames in succession and then to permit no replenishment of the frame for one frame period. Of course, the buffer 8 is being continuously refilled with conditional replenishment data. In this way, the 50 Hz data is used to update the frame running at 60 Hz. As in the case of the coder, the buffer size takes account of this intermittent operation, as well as smoothing out irregulations due to variations in the movement content of the picture.

The frame has only 312.5 interlaced lines and if the lines in a single field only were to be used to reproduce the 262.5 interlaced lines of the output field, there would be a considerable loss of detail. In order to overcome this the circuit of FIG. 6 uses the lines of both fields of the 312.5 line frame to generate the lines of each field of the 525 line frame. In addition, temporal interpolation is used to avoid the jumps which would otherwise occur as a result of the lack of alteration of one frame in six as described above. The temporal interpolation is performed by the multipliers 46 and 48 and the adding circuit 50 for one field of the 312.5 line frame and by multipliers 47 and 49 together with adding circuit 52 for the other field of the frame. The controller 58 generates the values required by the multipliers 46 to 49 to effect the required temporal interpolation. The values of K and L are not equal as might be supposed because the times of the fields concerned are different as they are interlaced and therefore are in different stages of their cycles of interpolation.

Figure 7:
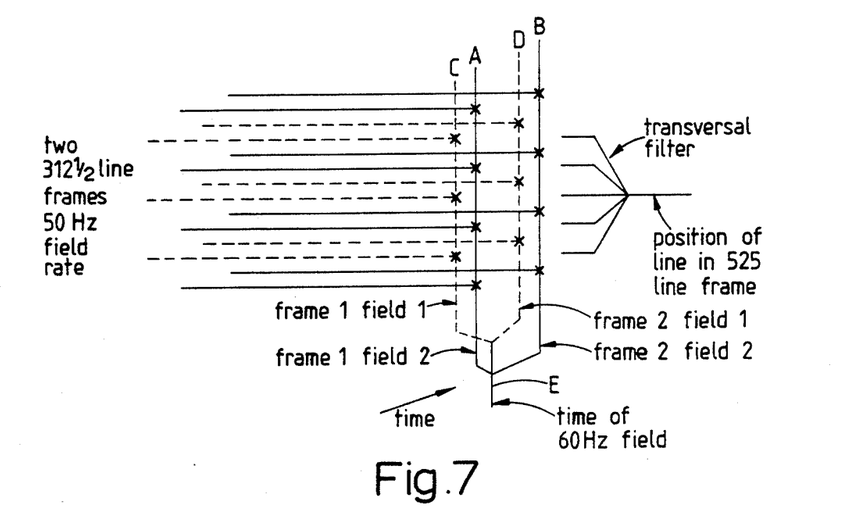
FIG. 7 is a diagram to be used in explaining the operation of FIG. 6.

Reference to FIG. 7 may help to clarify the operations performed by this part of the circuit. Vertical line A represents the time of occurrence of an earlier field and line B the time of occurrence of a later field; in practice, of course, a field occupies a period of time and these lines indicate corresponding positions in the fields. Broken lines C and D represent the times of occurrence of the interlaced fields immediately preceding the fields represented by the lines A and B. Line E represents the corresponding time of 60 Hz field and it will be immediately apparent that the time relationship of the line E relative to the lines C and D is different from its time relationship to the lines A and B.

The outputs of the adding circuits 50 and 52 correspond to lines of the 312.5 line frame running at 30 frames/second, and therefore each line occupies 107 $\mu$s. The line of a 525 line frame running at 60 Hz occupies 64 $\mu$s. The function of the buffers 51 and 53 is to receive the lines over a period of 107 $\mu$s and transmit them over 53.5 $\mu$s to the transversal filter 54.

Lines are taken alternately from the buffers 51, 53; this is illustrated schematically as a switch 54 which alternates every 53.5 $\mu$s. The output from this switch actually consists of 625 lines per frame (312.5 per field). The filter 55 forms a line interpolator, analogous to that used in the coder; the multipliers K1 to K5 are controlled in response to values stored in a read-only memory, varying during the course of a field such that the 312.5 lines output contain the necessary 262.5 lines correctly interpolated according to their position in the desired output. The output buffer 56 periodically discards the redundant lines and retimes the wanted lines to the correct duration of 64 μs.

The PCM television signal output is converted to a normal analogue signal by means of a digital to analogue converter on the basis of 256 picture elements per line.

The above description envisages a coder converting 525/60 signals to 312.5/50 conditional replenishment signals, followed by a decoder converting back to 525/60 signals. It is however not necessary that the input field rate be the same as the output field rate, or that there be a simple relationship between either and the transmitted rate (in fact, a field rate of 59.94 Hz [29.97 frames/sec] has already been mentioned). It will have been observed that the coding process involves a "frame skip" (one in six for a simple 30/25 conversion: for 29.97/25 conversion the skip is not made approximately every 1000 frames), and thus the system can be made to accommodate any frame rate equal to or greater than the transmitted frame rate. Similarly, the decoder assumes that the update rate of the recirculatory frame store will be less than or equal to the rate at which the frames are recirculated—i.e. the output video rate.

Thus for asynchronous 'single standard' working on system M, one could adopt a transmitted frame rate of 29.67 frames/second. This could then accommodate a 30 or 29.97 frames/second (nominal) input, provided the input was within 1 percent of its nominal rate. This arrangement, as compared with synchronous systems, is especially useful with unstable video sources, such as video recorders. Similarly the output from the coder could be locked to a local source of syncs (again, provided it were not more than 1 percent below nominal 29.97). Obviously, analogous figures could be adopted for nominal 25 frames/second or dual-standard working. Another advantage of the proposed system is that, because the frame stores in transmitter and receiver run under the control of independent clocks, one does not need to transmit clock justification information as is the case with the systems described in the papers referred to in the introduction.

The 25/30 frames/second systems described above with reference to FIGS. 4 and 6 include frame interpolation to avoid the jerkiness of motion that would otherwise result. In "single standard" systems, the rate at which fields are omitted or repeated is low, and the interpolation could, if desired, be omitted without causing appreciable distortion of perceived motion.

The system discussed in our earlier patent application mentioned above involves the transmission of buffer store control information to ensure accurate buffer tracking, especially in the presence of transmission errors. In the case of the systems described above, in which the video field rates at the two ends of the transmission path are asynchronous, this is not necessary. At the receiver, the decoding loop runs at a field rate determined locally, and since this is never less than the field rate of the incoming data, no difficulty arises. At the transmitting end, it is merely necessary to ensure (as in the case of the above mentioned patent application) that the rate at which data are generated is not such that the associated buffer will overflow (or underflow). This is true irrespective of the field rates used at the two ends of the link.

If, however, it is desired to interface a codec containing a coder of the type described above to one containing a "conventional" decoder, the latter will require information as to the encoder buffer state $B_E(t)$ for the purpose of checking whether the decoder buffer state $B_D(t)$ is in accordance with the relation:

$$B_E(t-\Delta t)+B_D(t)=V_R\Delta t$$

(where $V_R$ is the transmission path capacity and $\Delta t$ is the time between data entering the encoder buffer store and it leaving the decoder buffer store). Thus, if compatible operation is desired, such information would have to be provided by the coder. However, the actual coder buffer state is distorted by the intermittent operation of the coding loop, so that the value $B_E(t)$ which would have to be transmitted is not the actual buffer state but a calculated value of what the buffer state would have been if the number of fields actually encoded had been coded at a uniform rate. In the reverse direction, of course, the 'asynchronous' decoder simply ignores the encoder buffer information transmitted by the 'synchronous' coder.

Figure 8:
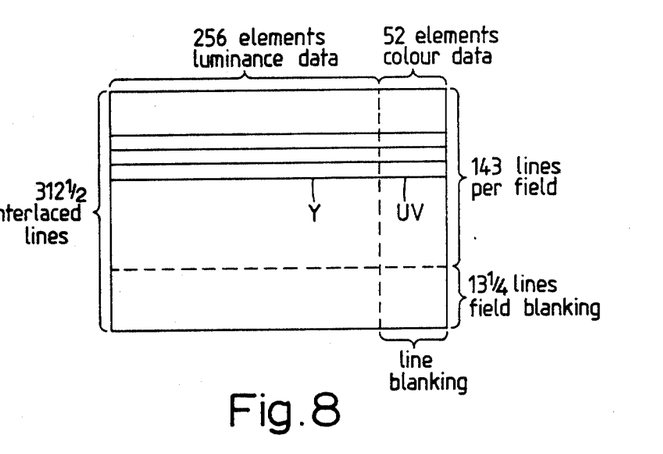
FIG. 8 shows a possible arrangement of the picture information in 312.5 line frame.

If the codecs are connected to colour television systems which may be NTSC, PAL or SECAM, this form of coding is not suitable for use in conjunction with conditional replenishment and FIG. 8 shows one form of television coding which could be employed. The frame consists of 312.5 interlaced lines and, in the example to be described, uses a field rate of 50 Hz. Of the lines, 143 lines in each field are used for picture information leaving 13.25 lines in each field for field blanking. In each line there are 256 elements of luminance data derived from the Y signal of the television system and 52 elements of colour data derived from the U and V signals. The U and V information is carried by alternate lines of the frame.

We claim:

1. In a television picture transmission system having a transmitter wherein digital television signals representing successive frames of a picture to be transmitted are compared with representations of earlier frames of a picture previously stored in a first picture store (20) and data relating to changes in elements of the picture are generated and transmitted to a receiver where representations of the earlier frames of the picture previously stored in a second picture store (43, 44) are altered in response to the transmitted data to reproduce the later frames of the picture, the improvement comprising:

means for transmitting digital television signals representing the picture to be transmitted at a frame rate which is different from the frame rate at which the frames of television signals are later reproduced in the receiver, and the frame rate at which the said digital television signals are transmitted is less than or equal to the lower of the two rates.

2. A transmission system according to claim 1, wherein:

said transmitter includes a picture store and means for comparing signals representing frames of the picture to be transmitted with representations of earlier frames of the picture stored in the picture store to generate television signals relating to changes in elements of the frame, and buffer means for receiving the generated television signals at the rate at which they are generated and supplying further television signals to an output at a different regular rate, wherein the frame rate at which such television signals output is lower than the frame rate of the picture to be transmitted; and said receiver includes means for decoding encoded television signals relating to changes in elements of the picture including buffer means for receiving television signals at a regular first average frame rate and decoding means having a picture store and control means responsive to television signals received by the buffer means representing changes in picture content in respect of successive frames of the picture to update the picture store and arranged to read data from the picture store to produce a video output signal, wherein the frame rate of the video signal produced by the receiver is greater than the average frame rate of the received television signals.

3. A coding apparatus for television signals comprising:

coding means including a picture store (20), means (21) for comparing signals representing frames of the picture to be transmitted with representations of earlier frames of the picture stored in the picture store, to generate digital television data signals relating to changes in elements of the frame and buffer means (5) for receiving that data at the rate at which it is generated and supplying it to an output at a regular rate, said coding means includes means for generating said television data signals at an average frame rate which is lower than the average rate of the picture to be transmitted.

4. A coding apparatus according to claim 3 wherein the comparing means (21) and picture store (2) form an updating loop which operates at the frame rate of the picture to be transmitted but is so controlled that its operation is periodically suspended for one field period or one frame period.

5. A coding apparatus according to claim 4 further comprising frame interpolation means (30, 31) preceding the coding means, arranged to interpolate between the values in successive frames for each picture element, the interpolation changing progressively from one suspension of the coding operation to the next so that the suspension of coding causes no substantial discontinuity in the movement represented by the sequence of coded data.

6. A coding apparatus according to claim 1, 3, 4 or 5 wherein the higher frame rate is 30 per second and the lower frame rate is 25 per second.

7. A decoding apparatus for encoded television signals comprising data relating to changes in elements of the picture, comprising:

buffer means (8) for receiving data at a regular rate, and decoding means including a picture store (43,44) and control means responsive to data received by the buffer means representing changes in picture content in respect of successive frames of the picture to update the picture store (43,44) and arranged to read data from the picture store to produce a video signal, wherein the average frame rate of the video signal produced is greater than the average frame rate of the received data.

8. A decoding apparatus according to claim 7 wherein the picture store (43, 44) and control means (42) form an updating loop arranged to operate at the higher rate, with means arranged periodically to suspend the updating of the picture store for a frame or field period.

9. A decoding apparatus according to claim 8 further comprising frame interpolation means (43-52,58) following the decoding means, arranged to interpolate between the values in successive frames for each picture element, the interpolation changing progressively from one suspension of the coding operation to the next so that the suspension of updating causes no substantial discontinuity in the movement represented by the video signal.

10. A decoding apparatus according to claim 9 wherein the picture store (43, 44) forms, or forms part of, storage means (43, 44, 45) for the interpolation means.

11. A decoding apparatus according to claim 7, 8, 9 or 10 wherein the higher frame rate is 30 per second and the lower frame rate is 25 per second.

12. A replenishment-type digital television system comprising:

television signal generation means for generating television video signals at a first average frame rate;

coding means connected to encode said generated television signals as replenishment-type digital television signals at a lower second average frame rate;

transmission means for transmitting said encoded replenishment-type digital television signals;

receiving means for receiving said encoded replenishment-type digital television signals; and decoding means connected to decode said received replenishment-type television signals and to asynchronously provide video output signals at an average frame rate which is no less than said second rate.

13. A replenishment-rate digital television system comprising:

television signal generation means for generating television video signals at a first average frame rate;

coding means connected to encode said generated television signals as replenishment-type digital television signals;

transmission means for transmitting said encoded replenishment-type digital television signals;

receiving means for receiving said encoded replenishment-type digital television signals; and decoding means connected to said received replenishment-type television signals and to provide video output signals at a second average frame rate.

14. A system according to claim 1, 2, 12 or 13 in which the number of lines in a frame of the picture to be transmitted is different from the number of lines in a frame of the picture reproduced in the receiver, the system including means for effecting spatial interpolation between elements in several lines of the picture to be transmitted to produce data relating to elements of a line of the picture reproduced in the receiver.

15. A replenishment-type digital television system comprising:

television transmission means for accepting video output signals $V_1$ of A lines/X Hz field rate and for transmitting replenishment digital television signals $V_2$ of B lines/Y Hz field rate; and television receiver means for receiving replenishment digital television signals $V_2$ of B lines/Y Hz field rate and for providing output video signals $V_3$ of C lines/Z Hz field rate;

wherein $Y \leq Z$, $Y \leq X$ and $V_1$ is asynchronous with respect to $V_3$.

16. A replenishment-type digital television system as in claim 15 wherein: A, B, C, X, Y and Z have the nominal values given below:

A=525; B=312.5; C=625; X=60; Y=50; Z=50.

17. A replenishment-type digital television system as in claim 16 wherein X has an actual value of substantially 59.94.

18. A replenishment-type digital television system as in claim 15 wherein $X \neq Y$ or $Y \neq Z$ and wherein at least one of said transmission means and said receiver means includes:

temporal interpolation means for interpolating between digital video signals having different field rates; and spatial interpolation means for interpolating between digital video signals having different numbers of lines per field.

* * * * *

UNITED STATES PATENT AND TRADEMARK OFFICE
CERTIFICATE OF CORRECTION

PATENT NO. : 4,609,941

DATED : 2 September 1986

INVENTOR(S) : Michael D. Carr, David G. Morrison & Richard C. Nicol

It is certified that error appears in the above-identified patent and that said Letters Patent is hereby corrected as shown below:

In the Drawings:
FIGURE 5 - Change "50" to --30--.

Signed and Sealed this

Seventh Day of April, 1987

Attest:

DONALD J. QUIGG

*Attesting Officer*  *Commissioner of Patents and Trademarks*